US009250771B1

(12) United States Patent
Décoret et al.

(10) Patent No.: US 9,250,771 B1
(45) Date of Patent: Feb. 2, 2016

(54) ASYNCHRONOUSLY INGESTING MEDIA CONTENT INTO A CONTENT MANAGEMENT SYSTEM FROM A CLIENT COMPUTER HAVING AN UNRELIABLE NETWORK CONNECTION

(71) Applicant: Google Inc., Mountain View, CA (US)

(72) Inventors: Xavier François Décoret, Zürich (CH); Ayite Herve Gaba Atti, Lome (TG); Ahmadou Tidjane Deme, Dakar (SN)

(73) Assignee: GOOGLE INC., Mountain View, CA (US)

( * ) Notice: Subject to any disclaimer, the term of this patent is extended or adjusted under 35 U.S.C. 154(b) by 114 days.

(21) Appl. No.: 13/836,726

(22) Filed: Mar. 15, 2013

Related U.S. Application Data

(60) Provisional application No. 61/653,973, filed on May 31, 2012.

(51) Int. Cl.
*G06F 3/00* (2006.01)
*G06F 3/0484* (2013.01)
*G06F 17/30* (2006.01)
*G06F 17/24* (2006.01)

(52) U.S. Cl.
CPC ........ *G06F 3/0484* (2013.01); *G06F 17/30017* (2013.01); *G06F 17/248* (2013.01)

(58) Field of Classification Search
CPC .......................... G06F 17/30017; G06F 17/248
USPC ........................................................ 715/723
See application file for complete search history.

(56) References Cited

U.S. PATENT DOCUMENTS

| 6,526,447 | B1 * | 2/2003 | Giammaria | 709/232 |
|---|---|---|---|---|
| 7,599,854 | B1 * | 10/2009 | Baum et al. | 705/26.1 |
| 2002/0025777 | A1 * | 2/2002 | Kawamata et al. | 455/3.05 |
| 2004/0030982 | A1 * | 2/2004 | Aldridge et al. | 714/776 |
| 2004/0083474 | A1 * | 4/2004 | McKinlay et al. | 717/176 |
| 2004/0172476 | A1 * | 9/2004 | Chapweske | 709/231 |
| 2008/0275965 | A1 * | 11/2008 | Torimoto | H04L 67/06 709/219 |
| 2009/0248693 | A1 * | 10/2009 | Sagar et al. | 707/10 |
| 2010/0319045 | A1 * | 12/2010 | Lee | 725/118 |
| 2012/0109952 | A1 | 5/2012 | Reddy | |

OTHER PUBLICATIONS

Office Action for U.S. Appl. No. 13/836,643 dated Mar. 5, 2015, 23 pages.

* cited by examiner

*Primary Examiner* — Linh K Pham
(74) *Attorney, Agent, or Firm* — Fenwick & West LLP

(57) ABSTRACT

A computer network for asynchronously ingesting media content into a content management system (CMS) is disclosed. The network includes a client computer located in a first geographical location, a server computer located in a second geographical location and a liaison computer located in a third geographical location. The client computer communicates with the server computer by way of a substandard network connection that is subject to frequent interruptions and/or low bandwidth. The liaison computer communicates with the server computer by way of a reliable network. The client computer includes a user interface wizard component that edits and bundles media content and prompts a user to select between uploading content to the server computer by way of the substandard network (e.g. piecemeal between interruptions) or storing the content in a local mobile storage device for uploading from the liaison computer.

20 Claims, 5 Drawing Sheets

ASYNCHRONOUSLY INGESTING MEDIA CONTENT INTO A CONTENT MANAGEMENT SYSTEM FROM A CLIENT COMPUTER HAVING AN UNRELIABLE NETWORK CONNECTION

CROSS-REFERENCE TO RELATED APPLICATIONS

This application claims the benefit of U.S. Provisional Application No. 61/653,973, filed May 31, 2012 and entitled ASYNCHRONOUSLY INGESTING MEDIA CONTENT INTO A CONTENT MANAGEMENT SYSTEM FROM A CLIENT COMPUTER HAVING AN UNRELIABLE NETWORK CONNECTION, the entirety of which is incorporated herein by reference.

TECHNICAL FIELD

The present invention generally relates asynchronous ingestion of media content.

BACKGROUND

Media communication technologies in many parts of the world are constrained by factors such as frequent interruptions to communication networks, low network bandwidths, and limited or unreliable availability of electricity. The cost to improve these communications networks and utilities is often substantial and the resources for providing or improving the infrastructure are either limited or unavailable. As such, these challenges are likely to exist in the long-term. Such challenges can constrain the ability of individuals and companies, e.g., media content creators, to transfer their works to audiences over computer networks. For example, Lagos, Nigeria, has a thriving entertainment industry, sometimes referred to as Nollywood, which produces large volumes of movies, television shows and musical videos each year. Yet, because of poor and unreliable computer networks in Nigeria, and generally in Africa, today, only a small fraction of that media content is uploaded on the Internet for world-wide viewing and possibly monetization.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

In an implementation of the subject disclosure, a computer system includes a client computer located in a first geographical location, a server computer located in a second geographical location and a liaison computer located in a third geographical location. The network connection between the client computer and the server computer is an unreliable network connection that is failure prone and/or is a low bandwidth connection. The network connection between the liaison computer and the server computer is a reliable network connection. The client computer includes an user interface (UI) wizard that facilitates editing of media content, bundling of the edited media content and transferring of the bundled media content to either the server computer over the unreliable network or to a local mobile storage device (e.g. a compact disk) for manual transfer (e.g. by car or courier service) to the liaison computer. Thus, the UI wizard provides for asynchronous ingestion of media content into the server computer by separating the editing and bundling tasks from the transferring task.

In an example, bundling refers to formatting the media content in a manner that is compatible with one or more tool chains of the server computer. The UI wizard prompts the user to optionally select between uploading a bundle to the server computer by way of the (potentially unreliable) network or to store the bundle in the local mobile storage device. If the user selects the uploading option, in one implementation, the client computer and the server computer are configured to complete the bundle transfer in a piecemeal manner, for example, by transferring pieces of the bundle in-between network interruptions in an automatically persistent manner. If the user selects to store the bundle in the mobile storage device, in one implementation, the client computer prepares the bundle for efficient upload. The liaison computer is configured to communicably couple to the mobile storage device and to upload the bundle to the server computer by way of a reliable (e.g. high speed) network connection.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

The subject disclosure is now described with reference to the drawings, wherein like reference numerals are used to refer to like elements throughout, and wherein.

DETAILED DESCRIPTION

Figure 1:
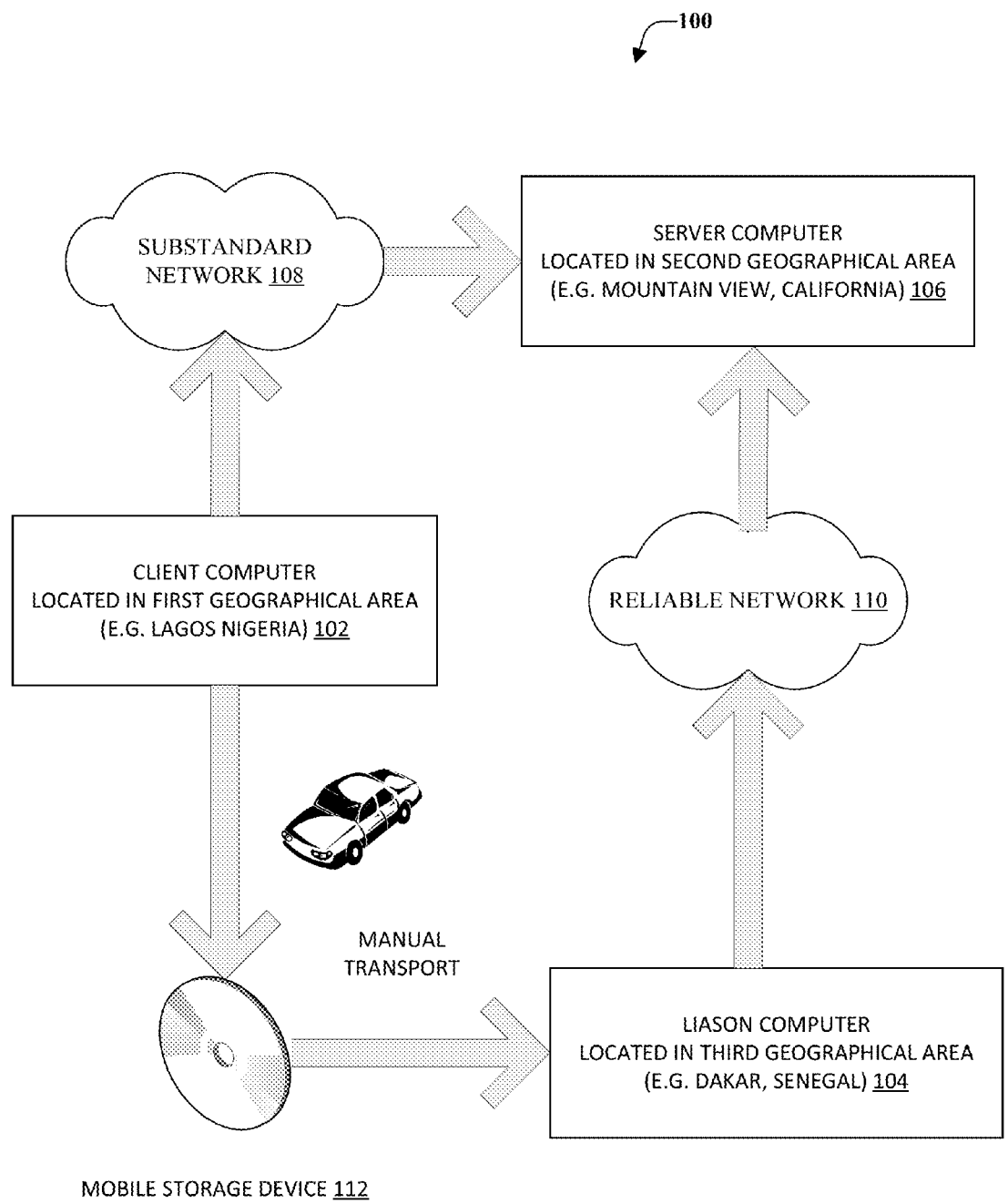
FIG. 1 is an illustration of an exemplary system having asynchronous media content ingestion capability, according to an implementation of this disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the innovation can be practiced without these specific details. In other instances, well-known structures and devices are shown in block diagram form in order to facilitate describing the subject disclosure.

FIG. 1 illustrates an exemplary computer network 100 having asynchronous media content ingestion capability. The network 100 includes a client computer 102, a liaison computer 104 and a server computer 106. The client computer 102 is located in a first geographical location and is communicably coupled to the server computer 106 by way of a substandard network connection. In an example, a substandard network connection refers to a network connection having a low bandwidth capability and thus not desirable or optimum for transferring large media files. In another example, a substandard network connection refers to a network connection that is prone to failures (e.g. unintentional interruptions) because of poor or limited infrastructure (e.g. limited or unreliable electricity supply) in the first geographical location. In yet another example, the substandard network connect refers to a normally reliable network connection that is temporarily substandard because of, for example, inclement weather conditions or problems at the network connection's control tower.

The client computer 102 includes an interactive user interface (UI) wizard that is configured to edit, bundle and transfer media content. According to an aspect of the subject disclosure, the UI wizard separates the editing and bundling functions from the transfer function, thereby providing for asynchronous ingestion of media content into the server computer 106, which can include, for example, a content management system (CMS) for a social website or video hosting website. In an example, editing refers to editing a user's created content to prepare it for uploading to the server computer 106 for viewing and/or listening by subscriber(s) of a service provided by the server computer 106 or systems coupled thereto. Editing can include editing of the user's metadata (e.g. identification of content and monetization policies) and account information (e.g. user's username and password). The UI wizard facilitates the editing of media content with user interaction, for example, by providing editing tools and prompting the user with questions and selection options.

Bundling refers to packaging the edited media content and metadata in a format that is compatible with one or more tool chains or tool processes of the server computer 106. A tool chain (or process) is the set of development programming tools that are used to create a software product. The development tools are used in a chain format, such that an output of a tool becomes an input for the next tool. A simple software development tool chain can consist of a text editor for editing source code, compiler and linker to transform the source code into an executable program, libraries to provide interfaces to the operating system, and a debugger. A complex software development tool chain, for example, one used for developing a product such as a video game, can include tools for preparing sound effects, music, textures, 3-dimensional models and animations, and for combining these resources into a finished product. In an example, the editing and bundling components of the UI wizard are software plug-in programs. In an example, the UI wizard components are downloaded from the server computer 106 to the client computer 102. In an example, the UI wizard components are downloaded from the server computer 106 to both the client computer 102 and the liaison computer 104.

In one implementation, bundling can include compression and/or encryption of the edited media content and metadata. Bundling can also refer to formatting the media content in a manner that is custom designed for easy uploading to the liaison computer 104 or the server computer 106, without requiring further editing or programming. Moreover, bundling can also refer to formatting the media content in a manner that allows the media content to pass through firewalls of the liaison computer 104 and the server computer 106, e.g., in a manner that includes one or more authentication keys or the like for passing through the firewalls. In one implementation, a bundle includes meta-instructions for ingestion of the bundle into a content management system (CMS). In one implementation, the bundle is saved with a unique file extension to prevent unintended manipulation. In one implementation, a user can unbundle the bundle, e.g., to edit the media content or metadata.

In an example, the client computer 102, the liaison computer 104 and the server computer 106 are located in remote from each other, e.g., in different cities. In an example, the client computer 102, the liaison computer 104 and the server computer 106 are located in different countries. In an example, the client computer 102 is located in a rural or remote area and the liaison computer 104 and the server computer 106 are located in urban or suburban areas.

Returning to discussion of the UI wizard of the client computer 102, the UI wizard also includes a transfer component (e.g. a software plug-in program) that prompts the user with an option to either upload the bundle to the server computer 106 or to store in a local storage device 112 (e.g. compact disk (CD), digital video disc (DVD) or other optical disk or drive, a flash drive, a hard disk drive, etc.). In other words, the transfer component separates the transfer function from the editing and bundling functions. If the user selects the upload option, the transfer component facilitates commencement of the transfer of the media content immediately or at a time selected by the user. If the user selects the storage option, the transfer component facilitates storage of the bundle in the mobile storage device 112.

The mobile storage device 112 can be transported to the liaison computer 104 by using Hertzian transportation means (also referred to as manual or mechanical transportation means), which can include postal service or couriers that use automobiles, ships, planes, trains, bicycles, scooters or other vehicles for transportation. According to an aspect of the subject disclosure, the need for manual/mechanical transportation of the mobile storage device 112 between the client computer 102 and the liaison computer 104 facilitates the generation an ecosystem of transport, delivery and upload services in the first and third geographical areas, for example, in Africa. The liaison computer 104 is configured to be communicably coupled to the mobile storage device and is coupled to the server computer 106 by way of a reliable network connection. In an example, the liaison computer 104 is located in a remote office facility of the social networking website service or video hosting website service that owns, uses, and/or manages the server computer 106. In an example, the liaison computer 104 is located in an Internet café or another location that may have invested in Internet-related equipment and infrastructure, e.g., the office of a technology company or a hotel. In an example, the liaison computer 104 is located in a facility of a service provider that is affiliated with the social networking website service or video hosting website service that owns, uses, and/or manages the server computer 106.

The liaison computer 106 is configured to upload the bundle to the server computer 104. Additionally, the liaison computer 104 can be configured to edit the contents of the bundle. According to an aspect of the subject disclosure, the operator of the liaison computer 104 needs to have only a minimal interaction with the liaison client computer 104, which can be limited to, for example, inserting the media content bundle mobile storage device (e.g., CD) into the liaison computer's 104 input port (e.g., CD drive) and selecting the upload option, because the bundle was already created by the client computer 102 in a format that is recognized by and compatible with the server computer 106. Accordingly, in one implementation, an operator of the liaison computer need not be technology savvy and can have little to no training on or knowledge of the content management system (CMS) of a video hosting website, and yet the asynchronous upload can still be completed. Moreover, in one implementation, an operator of the liaison computer must provide authentication information to the server computer 106 to be able upload a bundle from the liaison computer 104 to the server computer 106 on behalf of a third party content provider (e.g. user of the client computer 102). The authentication information can include username and password of the liaison computer's 104 operator and/or information that certifies the operator as someone qualified, licensed by or otherwise permitted by the user of the client computer, the liaison computer 104, and/or the server computer 106 to upload bundles on behalf of themselves or certain third parties.

According to an aspect of the subject disclosure, the UI wizard components include one or more application programs and/or plug-ins that are resident on the client computer 102. The application programs can provide an interactive graphical interface, including drop boxes, pushbutton icons and a drag and drop feature. The client computer 102 and the server computer 106 can communicate with each other using Hypertext Transfer Protocol Secure (HTTPS). The UI wizard can communicate with the server computer 106 by using an application program interface (API) that runs on top of the HTTPS. The HTTPS API is completely and automatically persistent, meaning that the transfer of data can stop and start without losing the integrity of the data being transferred. The data being transferred can include both the metadata and the creative media content. The API can also tolerate both intentional and inadvertent interruptions.

Figure 2:
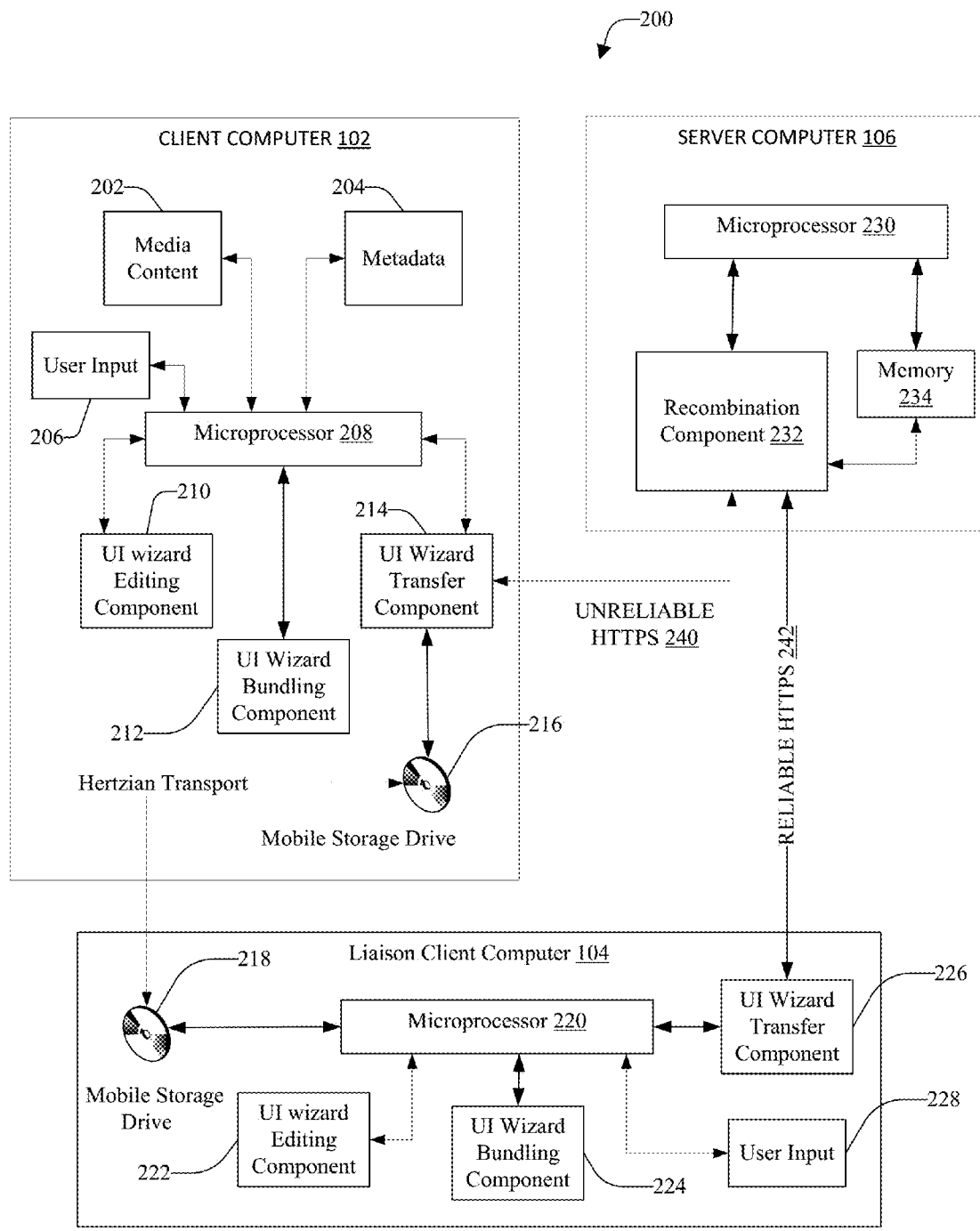
FIG. 2 is an illustration of component blocks and connections of the client, server and liaison computers, according to an implementation of the subject disclosure.

FIG. 2 illustrates a block diagram of exemplary components and connections of the client computer, the server computer and the liaison computer. The computer network system 200 includes the client computer 102, the liaison computer 104 and the server computer 106. The client computer 102 is communicably coupled to the server computer 106 by way of an potentially unreliable HTTPS network connection 240. The liaison computer 104 is communicably coupled to the server computer 106 by way of a reliable HTTPS network connection 242.

The client computer 102 includes a microprocessor 208 communicably coupled to the media content 202, the metadata 204 and the user input devices (e.g., keyboard, disk drive, video camera, etc.) 206. The media content 202 can be created by the user by using the client computer 102 or uploaded to the client computer, such as, by a user by using devices (e.g., video camera, SD card, or a hard disk drive containing a movie, etc.,). The microprocessor 208 is also coupled to the three components of the user interface (UI) wizard, namely the editing component 210, the bundling component 212 and the transfer component 214. It is to be appreciated that the editing component 210, the bundling component 212 and the transfer component 214 can communicate with each other directly or by way of the microprocessor 208. Moreover, the transfer component 214 can communicate with the mobile storage drive 216 or the recombination component 232 of the server computer 106 directly or by way of the microprocessor 208.

In an implementation, the client computer 102 is not directly communicably coupled to the liaison computer 104. The client computer 102 and the liaison computer 104 are located in two different geographical locations. In this implementation, a CD generated by the mobile storage drive 216 (e.g., a CD drive) of the client computer is transported to the liaison computer 104 by using Hertzian transportation methods (e.g. messenger or courier services, postal services, automobiles, etc.) As in shown FIG. 1, according to an aspect of the subject disclosure, the editing UI wizard component 210, the bundling component 212 and the transfer component 214 are separate and independent components. Stated differently, the media content and/or metadata can be bundled without first performing the editing function and the transfer component 214 can perform its functions independently and asynchronously with the editing and/or bundling functions. Moreover, the user of the client computer 102 can optionally select not to upload a bundle to the server computer 106 even when a reliable HTTPS connection between the client computer 102 and the server computer 106 is available. A reason for that decision can be that, for example, the user of the client computer 102 desires that a user of the liaison computer 104 perform certain edits to the media content 202 or metadata 204 prior to uploading the bundle to the server computer 106.

The liaison computer 104 includes an interface (e.g., a mobile storage drive 218) that is compatible with the format of the mobile storage received from the client computer 102 (e.g., a flash memory drive or CD generated by the CD drive of the client computer 102). The interface can be directly compatible or indirectly compatible by way of an adapter or format conversion device, for example. The interface, e.g., mobile storage drive 218, is coupled to the microprocessor 220. The microprocessor 220 can also be coupled to the UI wizard editing component 222, the UI wizard bundling component 224, the UI wizard transfer component 226 and the user input devices 228. The UI wizard components 222, 224 and 226 can be the same as or similar to the UI wizard components 210, 212 and 214 of the client computer 102. The UI wizard components 210, 212, 214, 222, 224 and 226 can be downloaded from the server computer 106. The UI wizard components 210, 212, 214, 222, 224 and 226 can be stored on non-transitory memory devices, e.g., memory devices that are used for long term persistent storage. Examples of non-transitory memory devices include random access memory, hard disks and flash memory devices. The bundling component 224 can unbundle a bundle received from the client computer 102 so that, for example, a user of the liaison computer 104 can make edits to the media content and metadata by using the interactive UI wizard editing component 222. It is understood that at least in some implementations, the user of the liaison computer 104 is required to enter his/her credentials to obtain permission from the server computer 106 to edit the media content and metadata stored on the mobile storage device and/or to upload a bundle to the server computer 106. For example, the credentials can include username and password. In one implementation, the identification information about persons or entities that are allowed to unbundle and edit the media content are included in the bundle as a part of the metadata. In this implementation, the credentials of the liaison computer 104 operator are compared with that information (e.g., by a component on the liaison computer or a server computer 106) to determine whether or not the liaison computer 104 operator is permitted to unbundle and edit the bundled media content. Upon completion of the editing function, the bundling component 224 can re-bundle the edited media content and metadata, and the transfer component 226 can upload the revised bundle to the server computer 106 by way of the reliable HTTPS connection 242.

The server computer 106 includes a microprocessor 230 coupled to the recombination component 232 and memory 234. The recombination component 232 is coupled to the transfer components 214 and 224, either directly or indirectly, e.g., by way of the microprocessor 230. A bundle received from the transfer component 214 or 224 is stored in the memory 234. The recombination component 232 is configured to receive portions of a bundle piecemeal, for example from the transfer component 214, and then recombine those portions into a complete bundle.

Figure 3:
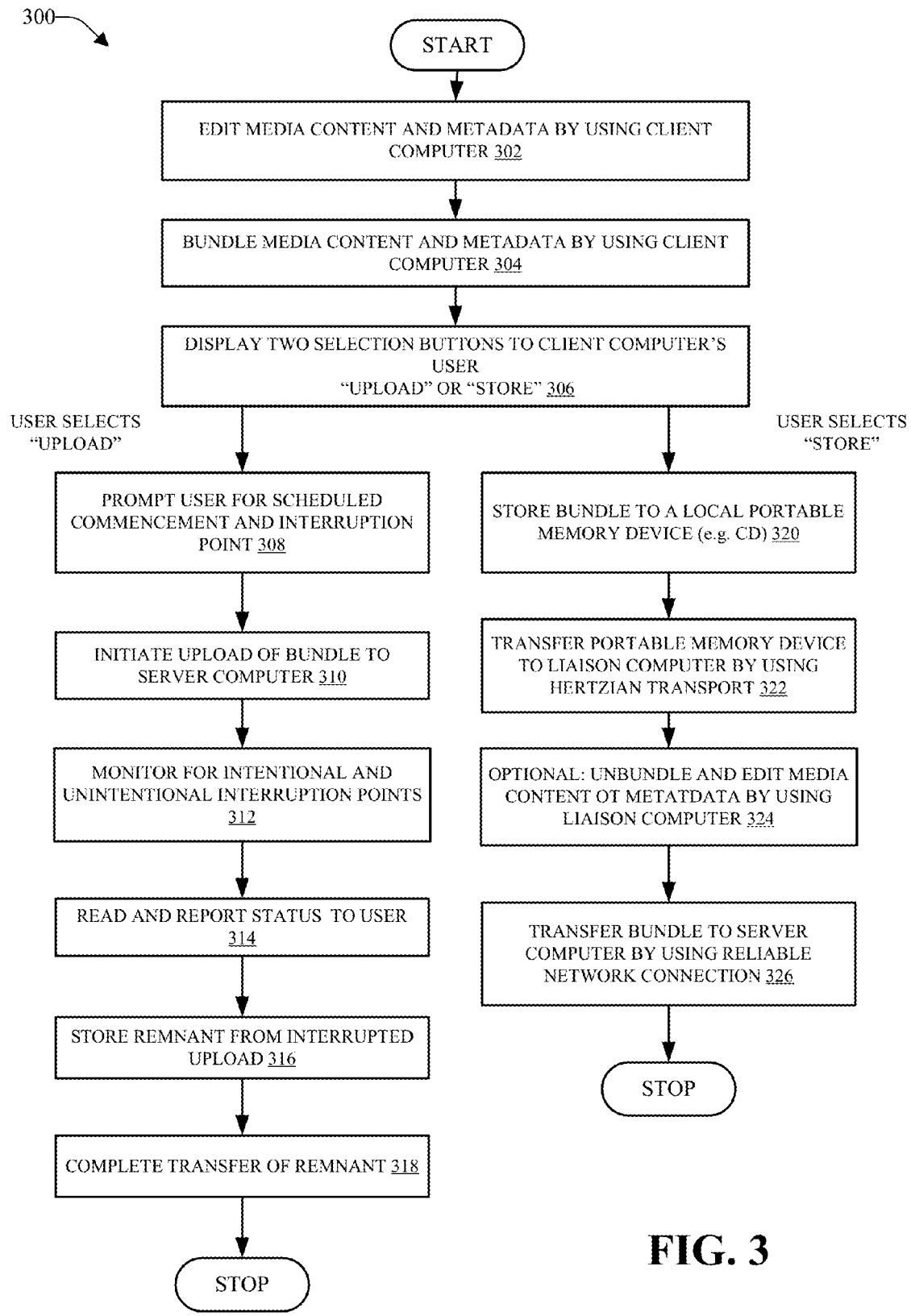
FIG. 3 is an illustration of a flow diagram of an exemplary method for asynchronously ingesting media content into a content management system (CMS), according to an implementation of the subject disclosure.

FIG. 3 illustrates a flow diagram for an exemplary method for asynchronously ingesting media content into a content management system (CMS), according to an implementation of the subject disclosure. At 302, media content and/or metadata are edited at a client computer (e.g. by using editing component 210). The metadata can include information about the media content and its creator, any monetization policies as well as authentication information about the client computer or its user (e.g. username, password, account identifier, etc.). At 304, the edited media content and/or metadata are bundled at the client computer (e.g. by using bundling component 212). Unedited media content and/or metadata can also be bundled, and so, in at least some implementations, Act 302 is optional. At 306, the client computer provides the user of the client computer with a tool to select between transferring the bundle to the server computer and storing the bundle in a local portable storage device (e.g. by using transfer component 214).

If the user selects the upload option (e.g. by using a computer mouse 206), then one or more of Acts 308, 310, 312, 314, 316 and 318 are performed. At 308, the client computer prompts the user to select a time marker for commencement of the transfer and/or an interruption point time marker. The user may select that the transfer commence immediately or at a later time (e.g. at close of business so that client computer is available for other business tasks). The user can also select an interruption time marker to stop the transfer at that a particular time if the transfer is not yet completed, so that, for example, the client computer becomes available for other activity. For example, the client computer can interrupt the transfer before the start of a workday, e.g., 8 am, if the client computer estimates that transfer will not be completed by that time. At 310, the upload of the bundle to the server computer commences at the time selected by the user, or a default time if no time is selected. At 312, the status of the network connection (e.g. active or interrupted) is monitored (e.g. by using transfer component 214). In one example, the status is continuously monitored. In another example, the status is periodically monitored. At 314, in case of an interruption to the network connection, the status is reported to the user, for example by way of the display of the client computer, a text message to the user, etc. The status information can include, for example, the time of the interruption and the percentage of the bundle that was successfully transferred to the server computer at the time of the interruption. At 316, in case of a network connection interruption, the remnant of the bundle (e.g. the portion of the bundle that was not successfully transferred to the server computer because of the network connection interruption) is stored in local memory of the client computer (e.g. by using the transfer component 214). In an implementation, remnant files can be identified with special file extensions. For example, a remnant file can have the same file name as the original bundle file but a different file extension from the original bundle file. In an implementation, an identifier can be attached to a remnant file to facilitate its re-combination with the already uploaded portion of the bundle. Moreover, in an implementation, the re-combination process for a bundle can be performed by a user of the client computer 102 upon completion of uploading of all components (e.g. including one or more remnants) of the bundle to the server computer 106. For example, the user can access the bundle components by way of the network connection 108 stored on the server computer 106 by using his/her account information (e.g. username and password) and sequence the bundle components for re-combination based on the time sequence in which they were received by the server computer 106. In an implementation, the server computer 106 is configured to attach a time stamp to each bundle component indicative of the time at which the bundle component was received at the server component 106. At 318, upon reactivation of the network connection, the remnant is transferred to the server computer. The transfer component can be configured to automatically commence the remnant transfer upon activation of the network connection, upon receiving a user command, or at a time after reactivation of the network connection. Alternatively, the remnant can be stored on a portable memory device and transported to the liaison computer by using Hertzian transport.

If the user selects the 'store' option (e.g. by using a computer mouse 206), then one or more of Acts 320, 322, 324 and 326 are performed. At 320, the bundle is stored in a portable memory device (e.g. a CD, a flash drive, or a portable hard disk drive). At 322, the portable memory device is transported to the liaison computer, e.g., using automobiles, courier services, messengers, etc. At 324, optionally, for example if permitted by the creator of the bundle, the bundle created by the client computer is unbundled and/or edited by a user of the liaison computer (e.g. by using editing component 222 and/or bundling component 224 respectively). The edited content can subsequently be re-bundled for upload. At 326, the bundle is uploaded from the liaison computer to the server computer over a reliable network connection (e.g. by using UI wizard transfer component 226).

Figure 4:
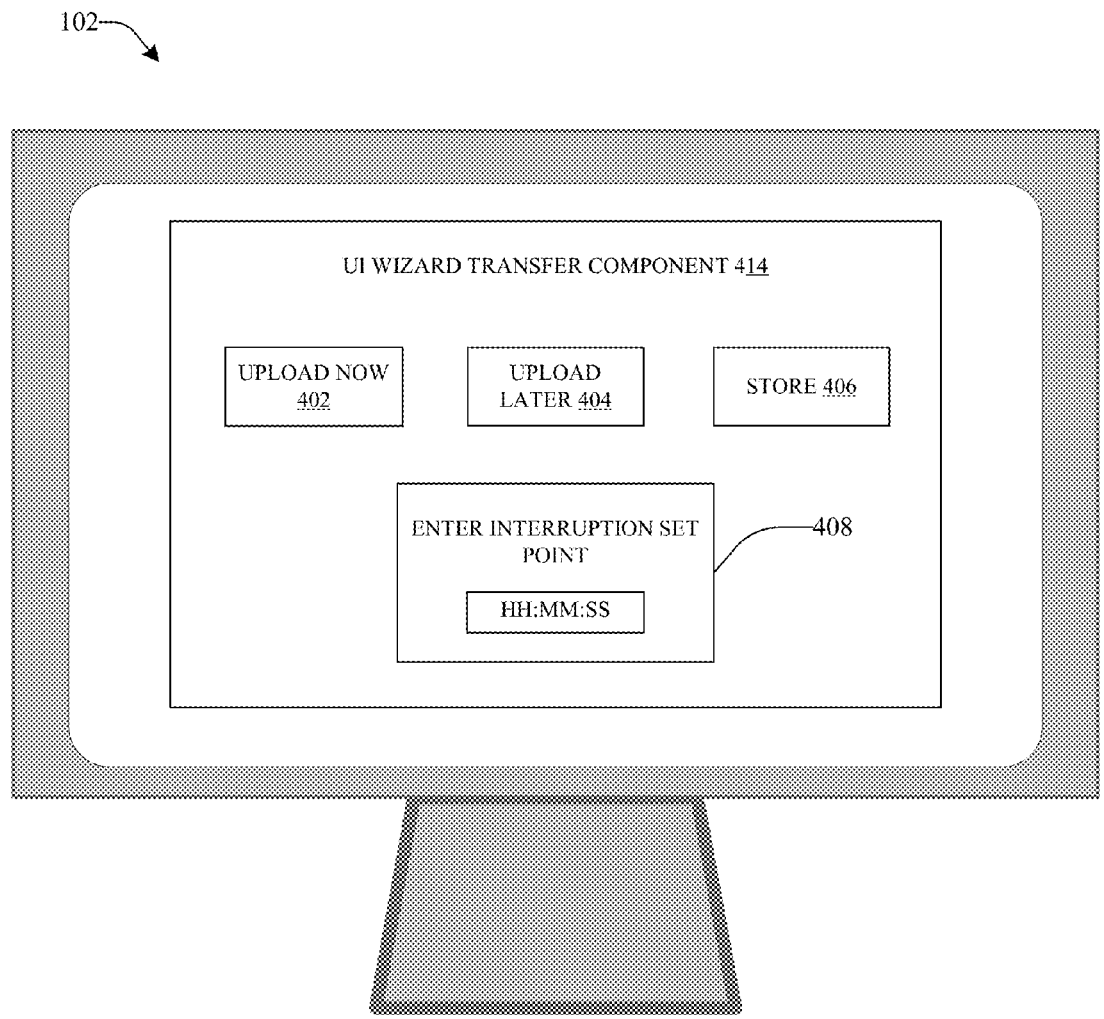
FIG. 4 illustrates an exemplary UI wizard transfer component, according to an implementation of the subject disclosure.

FIG. 4 illustrates an exemplary interactive UI wizard transfer component. An exemplary transfer component wizard 414 is shown on the display of the client computer 102. The transfer component wizard 414 includes the software push buttons 'Upload Now' 402, 'Upload Later' 404, 'Store' 406 and 'Enter Interruption Set Point' 408. By using these tools, a user of the client computer can optionally select between uploading a bundle immediately or at a later date and time, and storing the bundle in a local memory device. The user can also set an interruption to stop the transfer of the bundle to the server computer 106, for example, to make the client computer 102 available for other tasks.

Figure 5:
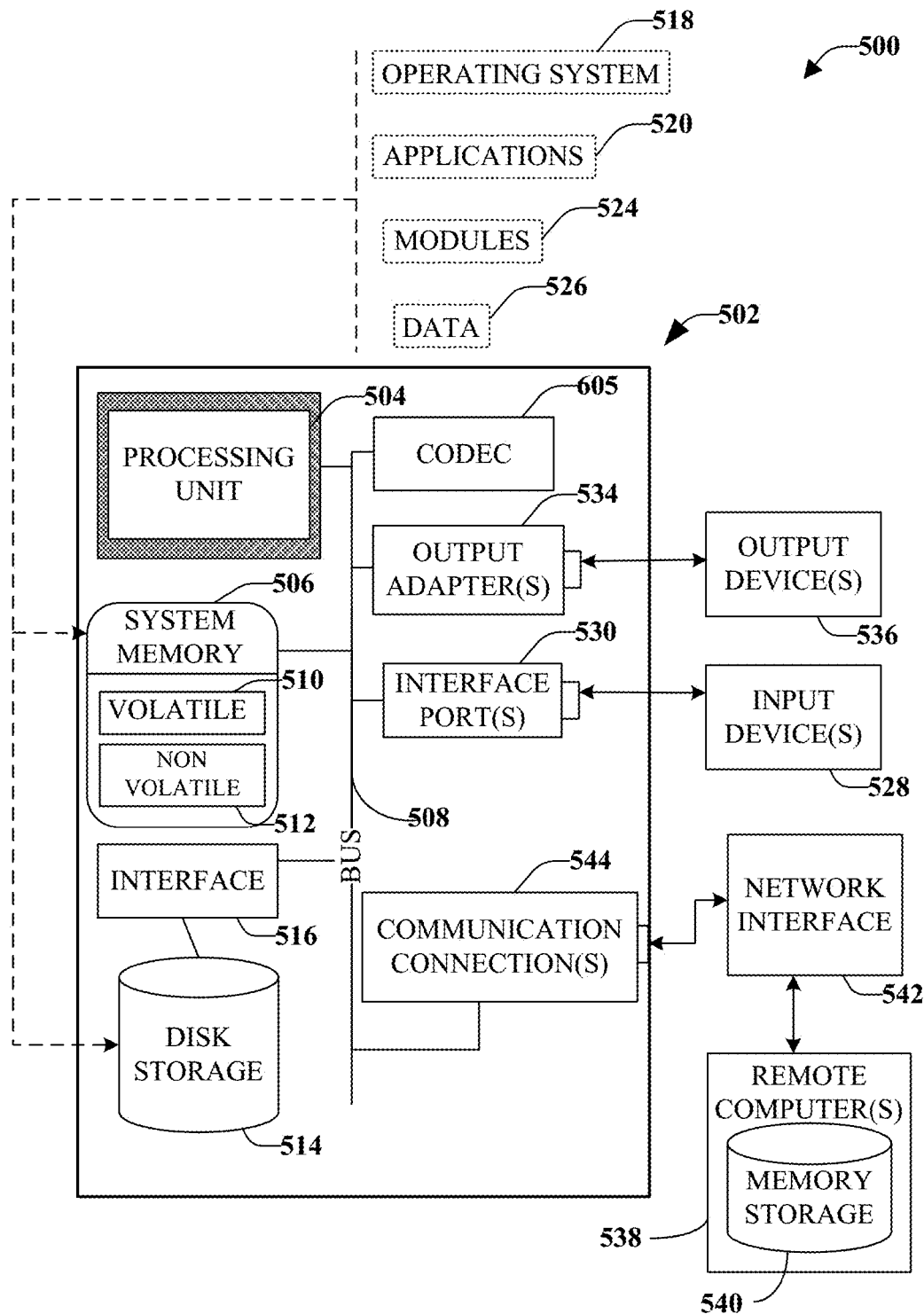
FIG. 5 is an illustration of a block diagram of an exemplary computer operable to execute aspects of this disclosure.

With reference to FIG. 5, a suitable environment 500 for implementing various aspects of the claimed subject matter includes a computer 502. The computer 502 includes a processing unit 504, a system memory 506, a codec 505, and a system bus 508. The system bus 508 couples system components including, but not limited to, the system memory 506 to the processing unit 504. The processing unit 504 can be any of various available processors. Dual microprocessors and other multiprocessor architectures also can be employed as the processing unit 504. The computer 502 can be representative of each of the client computer 102, the liaison computer 104 and the server computer 106. The processing unit 504 can be representative of the processing units 208, 220 and 230.

The system bus 508 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 506 includes volatile memory 510 and non-volatile memory 512. The basic input/output system (BIOS), containing the basic routines to transfer information between elements within the computer 502, such as during start-up, is stored in non-volatile memory 512. In addition, codec 505 may include at least one of an encoder or decoder, wherein the at least one of an encoder or decoder may consist of hardware, a combination of hardware and software, or software. Although, codec 505 is depicted as a separate component, codec 905 may be contained within non-volatile memory 512. By way of illustration, and not limitation, non-volatile memory 512 can include read only memory (ROM), programmable ROM (PROM), electrically programmable ROM (EPROM), electrically erasable programmable ROM (EEPROM), or flash memory. Volatile memory 510 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 502 may also include removable/non-removable, volatile/non-volatile computer storage medium. The FIG. 5 illustrates, for example, disk storage 514. Disk storage 514 includes, but is not limited to, devices like a magnetic disk drive, solid state disk (SSD) floppy disk drive, tape drive, Jaz drive, Zip drive, LS-70 drive, flash memory card, or memory stick. In addition, disk storage 514 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 514 to the system bus 908, a removable or non-removable interface is typically used, such as interface 516. Disk storage 514 can be representative of CD drives 216 and 218.

It is to be appreciated that FIG. 5 describes software that acts as an intermediary between users and the basic computer resources described in the suitable operating environment 500. Such software includes an operating system 518. Operating system 518, which can be stored on disk storage 514, acts to control and allocate resources of the computer system 502. Applications 520 take advantage of the management of resources by operating system 518 through program modules 524, and program data 526, such as the boot/shutdown transaction table and the like, stored either in system memory 506 or on disk storage 514. It is to be appreciated that the claimed subject matter can be implemented with various operating systems or combinations of operating systems. Applications 520 can include plug-in programs for the UI wizard components 210, 212, 214, 222, 224 and 226.

A user enters commands or information into the computer 502 through input device(s) 528. Input devices 528 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 504 through the system bus 508 via interface port(s) 530. Interface port(s) 530 include, for example, a serial port, a parallel port, a game port, and a universal serial bus (USB). Output device(s) 536 use some of the same type of ports as input device(s) 528. Thus, for example, a USB port may be used to provide input to computer 502, and to output information from computer 502 to an output device 536. Output adapter 534 is provided to illustrate that there are some output devices 536 like monitors, speakers, and printers, among other output devices 536, which require special adapters. The output adapters 534 include, by way of illustration and not limitation, video and sound cards that provide a means of connection between the output device 536 and the system bus 908. It should be noted that other devices and/or systems of devices provide both input and output capabilities such as remote computer(s) 538.

Computer 502 can operate in a networked environment using logical connections to one or more remote computers, such as remote computer(s) 538. The remote computer(s) 538 can be a personal computer, a server, a router, a network PC, a workstation, a microprocessor based appliance, a peer device, a smart phone, a tablet, or other network node, and typically includes many of the elements described relative to computer 502. For purposes of brevity, only a memory storage device 540 is illustrated with remote computer(s) 538. Remote computer(s) 938 is logically connected to computer 502 through a network interface 542 and then connected via communication connection(s) 544. Network interface 542 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 544 refers to the hardware/software employed to connect the network interface 542 to the bus 508. While communication connection 544 is shown for illustrative clarity inside computer 502, it can also be external to computer 502. The hardware/software necessary for connection to the network interface 542 includes, for exemplary purposes only, internal and external technologies such as, modems including regular telephone grade modems, cable modems and DSL modems, ISDN adapters, and wired and wireless Ethernet cards, hubs, and routers.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. Also, it is to be appreciated that in addition to the various implementations described herein, other similar implementations can be used or modifications and additions can be made to the described implementation(s) for performing the same or equivalent functionality of the corresponding implementation(s) without deviating from the scope of the subject disclosure. Accordingly, the invention is not to be limited to any single implementation, but rather can be construed in breadth, spirit and scope in accordance with the appended claims.

What is claimed is:

1. A system, comprising:
   a client computer located in a first geographical location including a non-transitory memory device and a processor that executes the following computer executable components:

a first user interface (UI) component that edits media content to create edited media content;

a second UI component that bundles the edited media content to create bundled media content;

a third UI component that prompts a user to select from options including uploading the bundled media content to a server computer located in a second geographical location via a network connection or storing the bundled media content in a movable storage device that is local to the client computer; and a transfer component that, in response to detecting an interruption in the uploading of the bundled media content to the server computer after a first portion of the bundled media content has been uploaded to the server computer, generates a remnant file comprising a second portion of the bundled media content that was not uploaded to the server computer and attaches a remnant file extension to the remnant file to facilitate identification of the remnant file as being the remnant file associated with the first portion of the bundled media content by the server computer and facilitate a recombination of the first portion of the bundled media content and the second portion of the bundled media content stored in the remnant file by the server computer after the server computer receives the second portion of the bundled media content, wherein the remnant file extension is different from a file extension associated with the first portion of the bundled media content and identifies the remnant file as being a type of file that comprises the second portion of the bundled media content, wherein the transfer component stores the remnant file on the movable storage device to facilitate transfer of the second portion of the bundled media content stored in the remnant file to the server computer via a liaison computer associated with the server component via another network connection, and wherein the liaison computer is located in a third geographical location.

2. The system of claim 1, wherein the first UI component edits metadata related to the media content in addition to editing the media content.

3. The system of claim 1, wherein the second UI component packages the media content in a format that is compatible with one or more tool chains of the server computer.

4. The system of claim 1, wherein the network connection includes a Secure Hypertext Transfer Protocols (HTTPS) connection.

5. The system of claim 4, wherein the third UI communicates with the server computer by using an application program interface (API).

6. The system of claim 1, wherein the network connection is subject to failure under a defined condition.

7. The system of claim 1, wherein the network connection is a bandwidth network connection that has a bandwidth that is below a defined standard level of bandwidth.

8. The system of claim 1, wherein the first geographical location is a first city and the second geographical location is a second city.

9. The system of claim 1, wherein the movable storage device includes at least one of a hard disk drive, a flash memory device, a compact disk (CD), or a digital video disk (DVD).

10. The system of claim 1, wherein the transfer component monitors a status of the uploading of the bundled media content to the server computer and detects the status.

11. The system of claim 10, wherein the transfer component detects the interruption and a time of the interruption based on the monitoring of the status.

12. The system of claim 1, wherein the movable storage device is configured to be communicably coupled to the liaison computer to facilitate uploading at least the second portion of the bundled media content to the server computer via the liaison computer.

13. The system of claim 1, wherein the liaison computer is configured to download the first UI component, the second UI component, and the third UI component from the server computer.

14. The system of claim 1, wherein the movable storage device is configured for manual transfer from the first geographical location to the third geographical location.

15. The system of claim 1, wherein the first UI component, the second UI component, and the third UI component are implemented as one or more software plug-in programs.

16. A method, comprising:

editing, by a client device, media content to generate edited media content;

bundling, by the client device, the edited media content to generate bundled media content;

prompting, by the client device, a user to select from options including uploading the bundled media content to a server computer using a network connection or storing the bundled media content in a movable storage device that is local to the client device, wherein the client device is located in a first geographical location and a server computer is located in a second geographical location;

commencing, by the client device, uploading of the bundled media content to the server computer via the network connection in response to the user selecting the uploading option;

detecting, by the client device, a failure condition associated with the network connection after a first portion of the bundled media content has been uploaded to the server computer, wherein the failure condition interrupts the uploading of the bundled media content;

storing, by the client device, a remnant file comprising a remnant portion of the bundled media content in a memory location of the client device in response to the detecting the failure condition, wherein the remnant portion of the bundled media content comprises a subset of the bundled media content that was not uploaded to the server computer due to the failure condition;

associating, by the client device, a remnant identifier with the remnant file to facilitate identifying the remnant file as being the remnant file associated with the first portion of the bundled media content by the server computer and recombining the first portion of the bundled media content and the remnant portion of the bundled media content stored in the remnant file by the server computer after the server computer receives the remnant file, wherein the remnant identifier is different from a file identifier associated with the first portion of the bundled media content and identifies the remnant file as being a type of file that comprises the remnant portion of the bundled media content; and storing, by the client device, the remnant file on the movable storage device to facilitate transferring the remnant portion of the bundled media content stored in the remnant file to the server computer via a liaison computer associated with the server component via another network connection, wherein the liaison computer is located in a third geographical location.

17. The method of claim 16, further comprising:
automatically commencing, by the client device, uploading a subset of the remnant portion to the server computer upon resolution of the failure condition.

18. A method, comprising:
commencing, by a system comprising a processor, uploading of media content from a client device to a server device via a network connection;
identifying, by the system, an interruption of the uploading of the media content after a first subset of the media content has been uploaded to the server device;
storing, by the system, a remnant subset of the media content in a remnant file in a memory location of a client device in response to the interruption, wherein the remnant subset includes a portion of the media content that was not uploaded to the server device as a result of the interruption;
associating, by the system, a defined file extension with the remnant file to facilitate identifying the remnant file as containing the remnant subset of the media content and facilitate recombining the first subset of the media content and the remnant subset of the media content stored in the remnant file by the server device after the server device receives the remnant subset of the media content, wherein the defined file extension is different from a file extension of the first subset of the media content; and
storing, by the system, the remnant file on a portable memory device to facilitate transferring the remnant portion of the bundled media content stored in the remnant file to the server device via another device that is associated with the server device via another network connection, wherein the client device is located in a first location, the server device is located in a second location, and the other device is located in a third location.

19. A method, comprising:
editing, by a system comprising a processor, media content to generate edited media content;
bundling, by the system, the edited media content to generate bundled media content;
initiating, by the system, uploading of the bundled media content from a client device to a remote server device via a network connection; and
in response to detecting a failure of the network connection after a first portion of the bundled media content has been uploaded to the remote server device, associating, by the system, a defined file extension with a remnant file that comprises a second portion of the bundled media content that was not uploaded to the server device to facilitate identifying the remnant file as containing the second portion of the bundled media content that is associated with the first portion of the bundled media content and facilitate recombining the first portion of the bundled media content and the second portion of the bundled media content by the server device after the server device receives the second portion of the media content, wherein the defined file extension is different from a file extension of the bundled media content; and
storing, by the system, the remnant file on a movable storage device to facilitate transferring the second portion of the bundled media content to the server device via a liaison device associated with the remote server device via another network connection, wherein the client device is located in a first geographical location, the remote server device is located in a second geographical location, and the liaison device is located in a third geographical location.

20. The method of claim 19, further comprising:
editing, by the system, metadata associated with the media content.

* * * * *